(12) United States Patent
Avent et al.

(10) Patent No.: US 8,882,582 B2
(45) Date of Patent: Nov. 11, 2014

(54) INTERACTIVE COMPUTER GAME REFRESHER ELEMENTS

(75) Inventors: Jason Avent, Hove (GB); David Jefferies, Hove (GB); James Callin, Brighton (GB)

(73) Assignee: Disney Enterprises, Inc., Burbank, CA (US)

( * ) Notice: Subject to any disclaimer, the term of this patent is extended or adjusted under 35 U.S.C. 154(b) by 450 days.

(21) Appl. No.: 12/576,003

(22) Filed: Oct. 8, 2009

(65) Prior Publication Data

US 2011/0086686 A1   Apr. 14, 2011

(51) Int. Cl.
  *A63F 9/24* (2006.01)
  *A63F 13/40* (2014.01)

(52) U.S. Cl.
  CPC ......... *A63F 13/10* (2013.01); *A63F 2300/5566* (2013.01); *A63F 2300/636* (2013.01); *A63F 2300/6027* (2013.01); *A63F 2300/8017* (2013.01)
  USPC ..................... 463/23; 463/30; 463/31; 463/35

(58) Field of Classification Search
  CPC .............. A63F 13/10; A63F 2300/305; A63F 2300/558; A63F 2300/6027; A63F 2300/634; A63F 2300/638
  See application file for complete search history.

(56) References Cited

U.S. PATENT DOCUMENTS

| | | | |
|---|---|---|---|
| 2004/0162136 A1* | 8/2004 | Yamato et al. | 463/29 |
| 2006/0025206 A1* | 2/2006 | Walker et al. | 463/20 |
| 2006/0148571 A1* | 7/2006 | Hossack et al. | 463/43 |
| 2007/0157093 A1* | 7/2007 | Karcher | 715/707 |
| 2009/0131152 A1* | 5/2009 | Busse | 463/23 |
| 2009/0163272 A1* | 6/2009 | Baker et al. | 463/29 |
| 2010/0009746 A1* | 1/2010 | Raymond et al. | 463/31 |
| 2010/0113116 A1* | 5/2010 | Theis | 463/7 |
| 2010/0292010 A1* | 11/2010 | Kira et al. | 463/43 |

* cited by examiner

*Primary Examiner* — Lawrence Galka
(74) *Attorney, Agent, or Firm* — Patterson + Sheridan, LLP

(57) ABSTRACT

Methods, apparatus and articles for dynamically facilitating user interaction with a program are provided. A user is may be provided with refresher elements (or a tutorial) based on the period of time since the user's last session (or level of skill). Programs which may benefit from such features include, inter alia, interactive games, word processors, spreadsheets, payroll applications etc.

29 Claims, 10 Drawing Sheets

INTERACTIVE COMPUTER GAME REFRESHER ELEMENTS

BACKGROUND

1. Field

The invention is concerned with interactive computer games, both interactive computer games where multiple users may play an interactive computer game together, for example connected via a network such as the Internet, or where an interactive computer game is played on a stand alone game console.

2. Description of the Related Art

An example interactive game device or system is shown in FIG. 1, and denoted by reference numeral 12. The device includes a graphics processor 24 controlling a display driver 22 via a graphics bus 38, a controller interface 32 receiving controller data on a controller interface bus 36, a central processor unit (CPU) 26, a network interface 42 connected to a network bus 44, and memory modules 28 and 30. A system bus 34 connects various elements. The display driver 22 drives the display 20 via display bus 40.

An interactive game device may include one or more monitors on which graphics may be displayed such as one or more LCDs (Liquid Crystal Display) and such a display or monitor may be provided within the game housing or as a separate monitor (such as a television). One or more speakers allowing game sounds to pass through may also be provided as part of the interactive game device or external speakers may be used such as provided in a television or attached to the game device. The interactive game device may include user input or interface devices such as a set of input devices that may include typical video game input devices such as a cross-shaped switch, a start switch, a select switch, an A button, a B button, an X button, a Y button, a power switch, a left or L button, a right or R button, and the like such as a touch screen or peripherals such as a joystick. Another input device is a touch panel or screen attached on the screen of a second LCD. The housing includes slots for accommodating a memory card (e.g., a game cartridge). The memory card or game cartridge is a storage medium storing the interactive game program run by the interactive game device. Alternatively the interactive game program(s) and graphics may be accessed via a communications network such as the Internet.

In implementations in which the video game device is a portable device or is a device that is linked to a television or other monitor/speaker system, the internal configuration of the video game device may include a CPU 26 mounted on an electronic circuit board positioned in the game housing. The CPU 26 may be connected to an input/output interface circuit, one or more GPU (Graphics Processing Unit) 24 and a monitor controller as display driver 22 such as via bus 34. A connector or memory interface may be provided for receiving a memory card, which may include ROM storing the video game program and RAM such as for rewritably storing backup data. The video game program stored in the ROM of the memory card is typically loaded to the RAM, and the loaded video game program is executed by the CPU during operation of the video game device. In addition to the video game program, the RAM also stores temporary data produced while the CPU is running a program. The input/output circuit may be connected to the user inputs or control switch section (e.g., user interface) and monitor. Memory blocks 28 and 30 connected to bus 34 represent different possible types of memory.

Interactive computer games which are available can be extremely complex and for a user to participate in a game successfully and with enjoyment they need to manage several different game components. As a user plays a game, these game components become more familiar and it is common for games to be organized in levels, such that after attainment of one level a user can move on to a next, more complex level where attainment of game skills in the earlier level are still applicable. Game components which a user needs to attain can pertain to a number of different elements, including the use of actuators on a control device, the story underlying the game and objectives in the game.

After leaving a video game play session for a long period of time, people forget the mechanics of the game, the controls, the plot of the game and other information that would help a user to progress at a similar rate to that which would have been achieved if they had not had a break from the game. When a user leaves a play session, the level that he has attained along with other user data is maintained in the user profile pertaining to that session such that he can return to the game at the same place at which he left it.

However, because of the reasons mentioned above, he may not have the necessary skill level to successfully tackle the game at the place at which he left it in his new play session because he will have forgotten key game components.

SUMMARY

The present invention relates generally to improving user experience for video game play sessions. After leaving a video game play session for a long period of time, people forget the mechanics of the game, the controls, the plot of the game and other information that would help them to progress at a similar rate to that which they would have achieved had there not been a break from the game. The invention provides a way of reminding players of these elements on their return to the game. In the described embodiments, the game can be programmed so that it is aware how much time has lapsed since the last play session for a particular user. On their return to the game they can be reminded about controls, the plot and game features for example.

The concepts described herein are particularly but not exclusively applicable playing a game on a games terminal. However, the idea of dynamically providing a user with refresher elements (or a tutorial) based on the period of time since the user's last session (or level of skill) also has utility for other interactive software applications, such as word processors, spreadsheets, payroll applications etc.

In this context, it is pointed out that while avatars are mentioned in the context of a gaming environment in the discussion of the preferred embodiments that follows, the invention contemplates use of avatars in a non-gaming environment such as a social network. Other non-gaming concepts to which the invention may be applicable include e-commerce sites navigated through using an avatar.

The invention provides a computer-implemented method of operating an interactive game on a games terminal, comprising: storing in a user profile a first time for a user, the first time denoting an end of a play session in a game, wherein the user profile contains user data pertaining to a user's play session of the interactive computer game; determining a second time for the user, the second time denoting commencement of a new play session in said game; and determining the difference between the first time and the second time and providing to the user refresher elements relating to the game, said refresher elements being selected based at least on said difference.

A first, stop time and second, return time can be determined from a real time clock on the computer games terminal.

It will be appreciated that a play session can reach a stop time either when a user logs out or when a user puts a session on pause.

The refresher elements can be provided to a user by displaying them on a display of the computer games terminal, or using audio signals.

The level of the game attained by a user at the stop time can be stored in the user profile, and refresher elements can be provided based on the attained level of play, as well as on the determined time difference.

The refresher elements can include primary objectives of the game; secondary objectives of the game; short term goal; medium term goal; and other plot related elements.

Alternatively or additionally the refresher elements can relate to the mechanics of the game, for example the use of actuators on a control device for playing the game.

Alternatively or additionally the refresher elements can include an indication of the story underlying the game, and in particular a summary of the story up to point at which the user left the game.

In order to provide a layered structure of refresher elements, they can be arranged in groups, each group being provided to user depending on the time difference, wherein a first group of said refresher elements is provided at a first time difference, and said first and a second group of refresher elements is provided at a second difference, longer than said first difference.

The refresher elements can include an interactive tutorial.

The invention further provides a computer game terminal for operating an interactive computer game comprising: an interface for receiving user input data from a controller associated with the computer games terminal whereby a user can play the interactive computer game; a store in which a user profile is maintained, the user profile holding user data pertaining to a user's play session of the interactive computer game; means for recording in the user profile a stop time for the user, the stop time denoting an end of a play session in a game; means for noting a return time for the user, the return time denoting commencement of a new play session in said game; and means for determining the difference between the stop time and the return time and providing to the user refresher elements relating to the game, said refresher elements being selected based on said difference.

The invention further provides a computer, comprising: a memory containing a program; a computer processor which when executing the program contained in the memory, performs an operation comprising: storing in a user profile a first time for a user, the first time denoting an end of a play session in a game, wherein the user profile contains user data pertaining to a user's play session of the interactive computer game; determining a second time for the user, the second time denoting commencement of a new play session in said game; and determining the difference between the first time and the second time and providing to the user refresher elements relating to the game, said refresher elements being selected based at least on said difference.

The invention further provides a computer readable storage medium containing a program which, when executed by one or more processors, performs an operation comprising: storing in a user profile a stop time for a user, the stop time denoting an end of play session in a game, wherein the user profile contains user data pertaining to a user's play session of the interactive computer game; determining a return time for the user, the return time denoting commencement of a new play session in said game; and determining the difference between the stop time and the return time and providing to the user refresher elements relating to the game, said refresher elements being selected based at least on said difference.

The invention further provides a method a computer-implemented method of operating an interactive computer game on a computer games terminal, comprising: monitoring using a processor at least one performance metric of a user in a gaming session of the interactive computer game; the processor determining based on the at least one performance metric a standard of play of the user; and the processor presenting an interactive tutorial to the user based on the standard of play.

The invention further provides a system a system for operating an interactive computer game on a computer games terminal, comprising: one or more computer processors configured to execute; a monitor component operable to monitor at least one performance metric of a user in a gaming session of the interactive computer game; a play component operable to determine based on the at least one performance metric a standard of play of the user; and a tutorial component for presenting an interactive tutorial to the user based on the standard of play.

The invention further provides a game server a game server for managing an interactive computer gaming session connected in a network to a plurality of computer game terminals comprising: a network interface adapted to receive over the network from a computer games terminal a determined standard of play of a user based on at least one performance metric monitored during the gaming session; an interactive tutorial selector for selecting an interactive tutorial from a set of predetermined interactive tutorials stored in a memory based on the standard of play, wherein the network interface is also adapted to transmit the selected interactive tutorial over the network to the computer games terminal.

The invention further provides a computer games terminal a computer games terminal for operating an interactive computer game comprising: a central processor unit adapted to monitor at least one performance metric of a user in a gaming session of the interactive computer game, and further adapted to determine based on the at least one performance metric a standard of play of the user; and a tutorial component for presenting an interactive tutorial if the determined standard of play is below a predetermined threshold.

The invention further provides a computer readable storage medium a computer readable storage medium containing a program which, when executed by one or more processors, performs an operation comprising: monitoring at least one performance metric of a user in a gaming session of the interactive computer game; determining based on the at least one performance metric a standard of play of the user; and presenting an interactive tutorial to the user if the standard of play is below a predetermined threshold.

The invention further provides a computer readable storage medium containing a program which, when executed y one or more processors of a respective one or more server computers connected to a plurality of interconnected computer games terminals connected to each other, performs an operation comprising: receiving over the network, from a computer games terminal of the plurality of interconnected computer games terminals, at least one determined standard of play of a user based on at least one performance metric monitored during the gaming session; selecting an interactive tutorial from a set of predetermined interactive tutorials stored in a memory if the standard of play does not meet a predetermined threshold; and transmitting the selected interactive tutorial over the network to the computer games terminal.

Above aspects of the invention relates to the provision to a user of an interactive tutorial which is based on his standard of play. Thus, a user is only delivered instructions which are appropriate to his level of play and skill base.

DESCRIPTION OF PREFERRED EMBODIMENTS

The invention is described herein by way of reference to particular examples and preferred embodiments. The invention is not limited to any aspects of such examples and preferred embodiments. The examples and preferred embodiments are presented for the purpose of illustrating the concepts of the invention and for ease of understanding of the invention, and do not limit the scope of the invention.

The present invention relates generally to improving user experience for video game play sessions. After leaving a video game play session for a long period of time, people forget the mechanics of the game, the controls, the plot of the game and other information that would help them to progress at a similar rate to that which they would have achieved had there not been a break from the game. The invention provides a way of reminding players of these elements on their return to the game. In the described embodiments, the game can be programmed so that it is aware how much time has lapsed since the last play session for a particular user. On their return to the game they can be reminded about controls, the plot and game features for example.

Embodiments of the invention are described in the context of a video game device capable of executing a video game program. While such an interactive game program can be executed under any computer system capable of communicating with other devices, the following description is directed to an interactive game program being executed by an interactive game device (e.g., a particular example of an information processing device or computing device) which may be a standalone device for one or more users or a device capable of communicating with other devices. The invention is not limited to use to a particular interactive game device, but it may be implemented with any interactive game device capable of executing an interactive game program according to the present invention, such as a portable interactive game device, an interactive game device adapted for use with a television or other monitor, a computer such as a desktop, laptop, notebook, or other computer, a telephone such as a cellular phone, or any other electronic device adapted for running an interactive game program including the animation methods of the invention.

Figure 1:
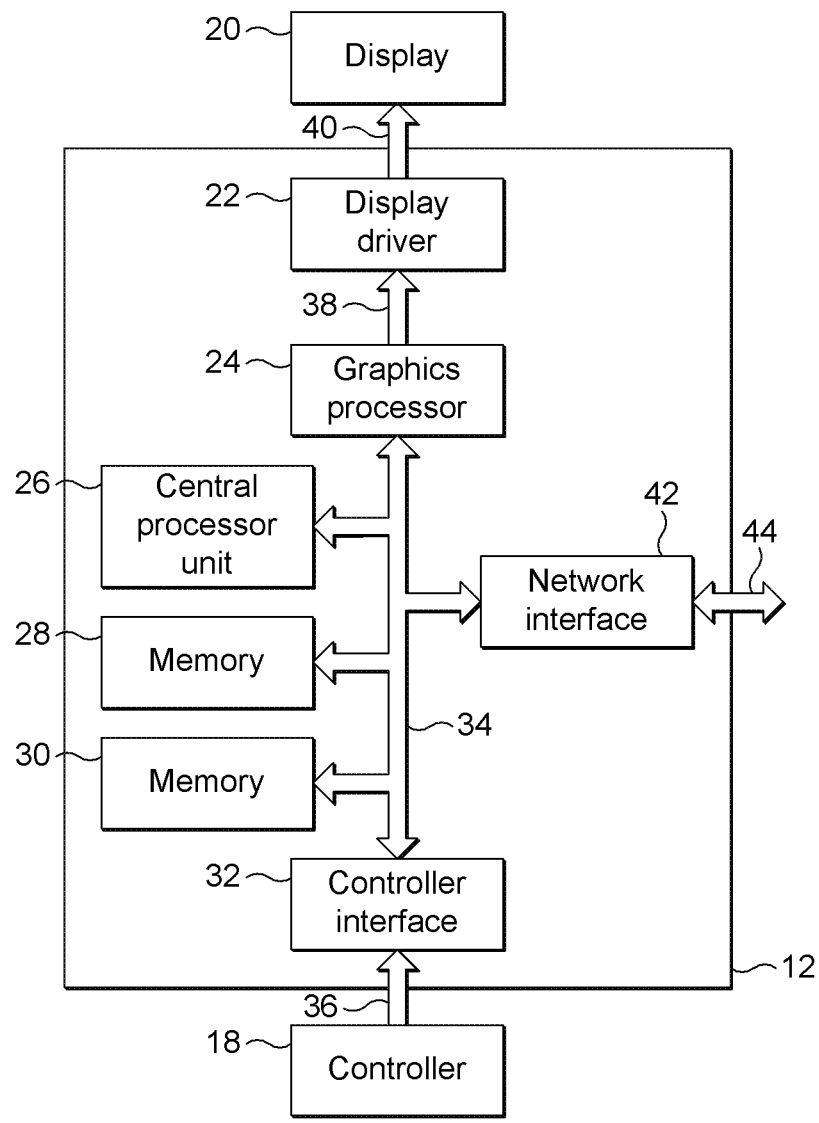
FIG. 1 illustrates a general architecture of a computer games console as know in the art.
Figure 1A:
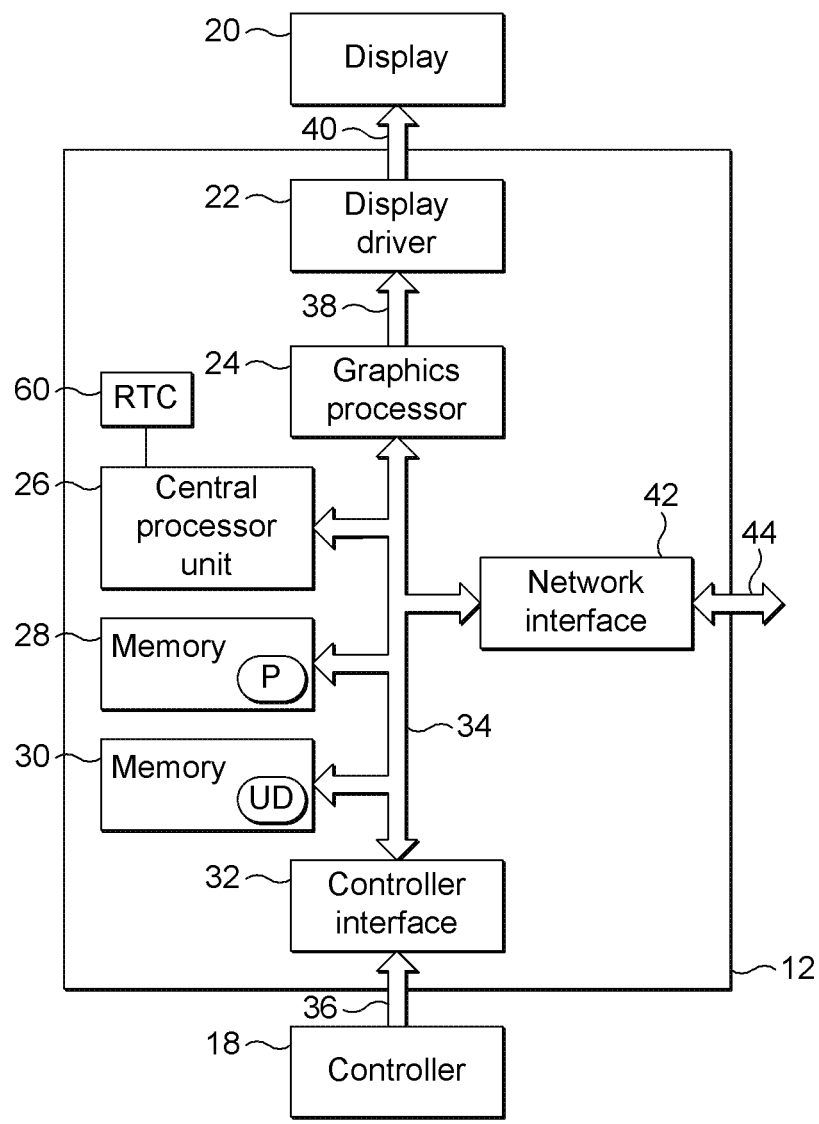
FIG. 1A illustrates the main functional elements of a computer games console in accordance with an embodiment of the invention.

An example of a suitable interactive game device is illustrated in FIG. 1A. Components having the same reference numerals as in FIG. 1 denote similar components. The device in FIG. 1A is additionally shown to have a real time clock RTC 60. Moreover, the program and data stored in the memory blocks 28 and 30 are different from that in FIG. 1 to implement embodiments of the invention. The components of the present invention described in the following embodiment are embodied in a computer program P which is loaded into a ROM (represented by memory block 28) and the user data UD held in RAM represented by memory block 30 which in combination generate animations and images for display on the display 20 in dependence on user activity as effected at the controller 18.

Figure 2:
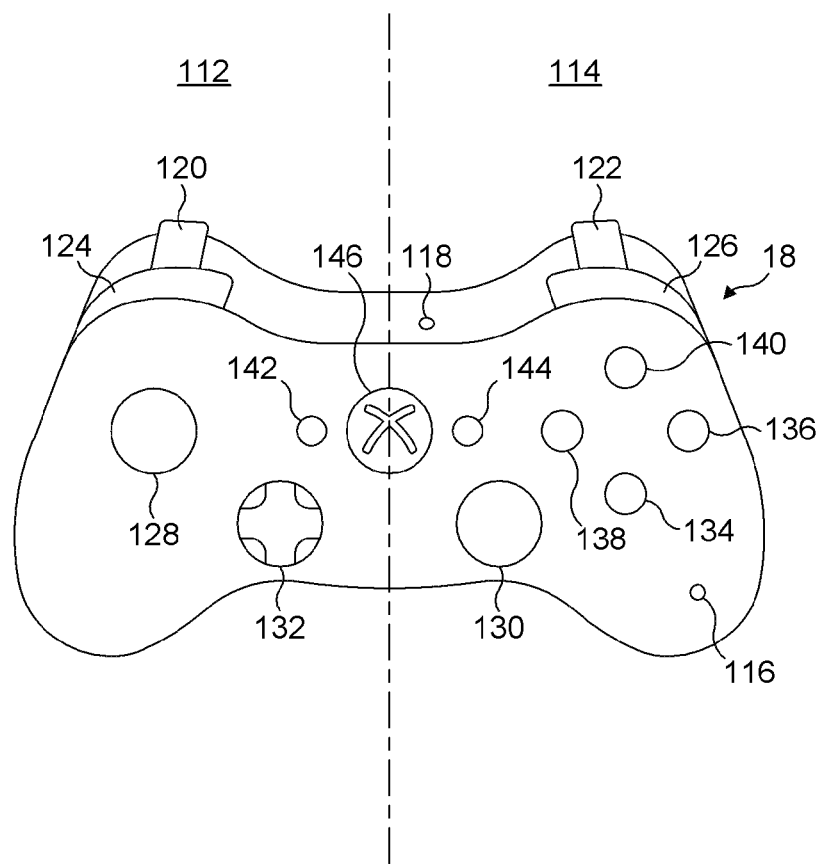
FIG. 2 is a schematic diagram of a controller.
Figure 3:
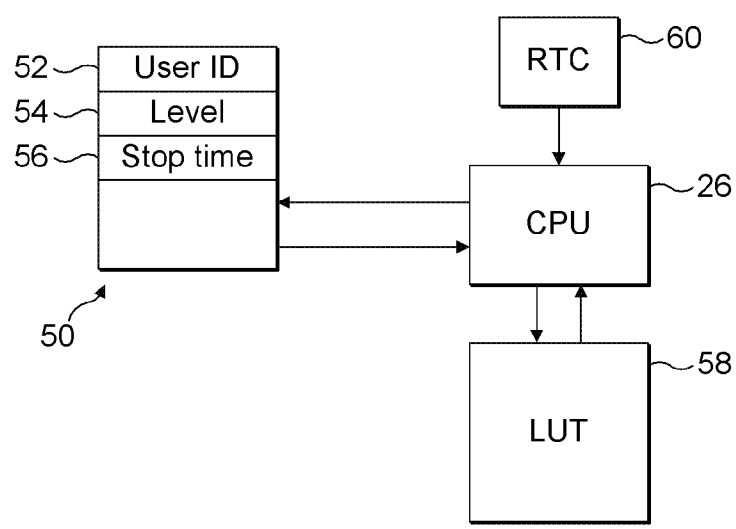
FIG. 3 is a schematic diagram of the data structure.

FIG. 2 is a schematic diagram of a controller 18.

A wide variety of controllers are known in the art and it will be appreciated that the present controller is described by way of example only.

The controller 18 may be used to provide inputs to a game console and allow a player to control game characters during gameplay. FIG. 2 specifically shows a controller for an Xbox® games console; however it will be apparent to those skilled in the art that games implementing the invention may also be controlled using any other game console and any other console controller.

The controller 18 is designed to be held in both hands of a game player and as such has been split into a left side 112 and a right side 114 to aid its description. The controller 18 has a front face 116 and a top face 118 upon which are positioned a number of control interfaces. The control interfaces are operable by a game player to provide instructions to a console when playing a game. The control interfaces may be hard, i.e. their function may be fixed, or soft, i.e. their function may change dependent on game scenarios.

Positioned on the top face 118 of the controller 18 are a left trigger 120, a right trigger 122, a left bumper 124 and a right bumper 126. Positioned on the front face 116 of the controller 18 are a left thumbstick 128, a right thumbstick 130, a directional pad 132, an A button 134, a B button 136, an X button 138 and a Y button 140. The above-mentioned control interfaces represent the major playing controls used by players while in game play, i.e. the above-mentioned control interfaces provide functions for control of characters within a game.

In addition there are also positioned on the front face 116 of the controller 18 a back button 142, a forward button 144 and an Xbox guide button 146. These control interfaces are commonly used to control the non-game play aspects of a console game, i.e. starting a game, and pausing and restarting game play.

It will be appreciated by those skilled in the art that the control interfaces positioned on the controller may have other configurations and may provide different functions within a game. Embodiments of the invention are described herein using the functions of the controller defined for the game Pure, a racing game developed by Disney. it will also be appreciated that the use of such functions is illustrative only and does not limit the scope of the invention.

Thus, each actuating element on the controller has an effect in the game. The actuating elements can be actuated singly or in multiple combinations, each combination having a different effect in the game. It is also possible that a particular combination can have a different effect at one place in the game as compared with an effect in a different place in the game. The effect of the controller on the game is referred to herein as the mechanics of the game.

A game can have a story or plot involving a number of different characters, whose actions in the game can be controlled by the controller using the actuating elements on the controller. However, the response of a character may depend on the preceding history of the game and on his motivations.

It is common in such games for the user to attain power or points by succeeding at certain challenges. There may be short term, medium or long term goals to be attained. A user may need to attain primary or secondary objectives in a game.

As a game progresses, a user may attain different levels of achievement in a game, each subsequent level being more complex than the preceding level. When a user commences a play session in a new game, he starts at the most basic level and has to earn the right to attain subsequent levels. When he stops playing the game and leaves that game session, the level that he has attained is stored in a user profile 50 in the RAM 30. The user profile 50 comprises a user identifier which identifies that particular user (for example based on a user login) 52 and an attainment level 54 which is updated at the end of a play session. The user profile also has a location for holding a stop time 56 which is updated from a real time clock 60 by the CPU 26 at the end of the play session.

The RAM 30 also holds a lookup table 58 which can be accessed by the CPU 26. Access to the lookup table will be described more fully below.

The lookup table holds a plurality of refresher elements, each refresher element being capable of being displayed on the display 20.

A first refresher element is an image of the controller with a diagrammatic illustration of the effect of actuating one or more of the actuating elements singly or in combination. The first refresher element can take a basic form which would represent operation of the controller at a basic level in the game or a more complex form which would represent operation of the controller at a later, more complex level in the game. This refresher element is referred to herein as a control or mechanics refresher element.

A second refresher element in the lookup table 58 is a brief textual description of the story or plot of the game, including for example key characters and their motivations. The text can be delivered to a user via the display 20 or can be spoken in the form of an audio signal as a voice over. Once again, the refresher element can be different depending on the place that the user has reached in the game, related to the attainment level 54.

A third refresher element is in the form of animations or images which can be displayed identifying goals or objectives for the game, which once again can depend on the level which the user has reached.

According to described embodiments of the present invention, access to the lookup table 58 by the CPU 26 is based not only on the level of attainment that a user has reached but on the time for which a user has been absent from the game. When a user returns to the game and opens a new play session, his return time is noted using the real time clock 60 and the CPU 26 executes code to compare the return time to the stop time 56. The difference is noted and the length of absence of the user is thereby determined. The length of absence is used to access the lookup table 58 along with the level of attainment.

The refresher elements are selected to be provided to a user based on the length of absence and optionally the level of attainment. For example, if a user has only been absent for a short time, for example a day, refresher elements from the lookup table 58 will be selected to indicate to the user more advanced components of the game, such as a free style mode or more advanced tricks. If the user has been absent for a longer period of time, for example a week, the refresher elements which are selected will indicate to the user the more basic use of the controller 18 and more basic plot elements, as well as the refresher elements which were selected for a shorter absence (for example free style mode and more powerful tricks).

Thus, there is a layered structure of refresher elements which can be built up such that a user is presented with information appropriate to the length of time he has been away from the game.

The load structure can be implemented by holding the refresher elements in the lookup table in groups, each group associated with a particular time difference. When it has been ascertained that a user has been away for a first time difference, a first group of refresher elements can be presented to him. If it is ascertained that a user has been away for a second time difference, he can be presented with the first group of refresher elements (assuming the second time difference is longer than the first time difference) and a second group of refresher elements appropriate to the longer time difference.

Figure 4:
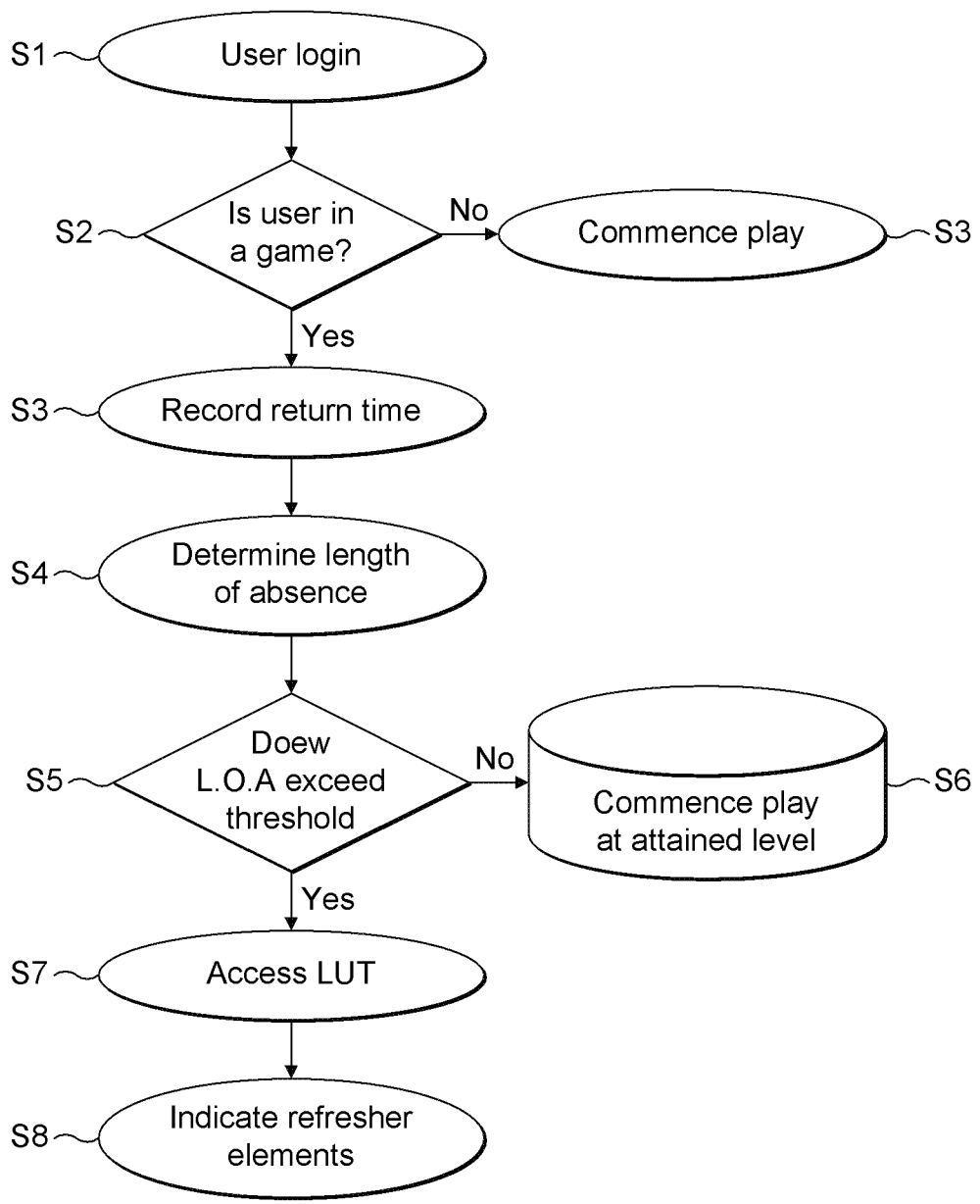
FIG. 4 is a flow diagram of the main steps of the method in accordance with one embodiment of the invention.

FIG. 4 is a flow chart illustrating the steps implemented by the computer program which is executed on the CPU 26 when a user logs in at step S1. At step S2, it is determined whether or not the user is already in a game by accessing the user profile which holds user data. If the user data does not indicate any attained level for the user in the game that he has logged into, it is assumed that he is a new user and not a returning user and the process launches the game at the step S3 of commence play.

If it is determined that the user has user data indicating that he is already in a game and has attained a certain level in that game, the time at which the user returns is recorded in step S3. The length of absence is determined in step S4 by comparing the return time with the stop time which is in the user profile 50 and was updated when the user last stopped playing the game. At step S5 it is determined whether or not the length of absence exceeds a predetermined threshold. If it does not, the process moves to step S6 and the game is launched to commence play at the attained level.

If the determined length of absence does exceed the threshold, in step S7, the lookup table 58 is accessed by the CPU to recall selected refresher elements based on the determined length of absence and the attained level. At step S8, these refresher elements are indicated to a user, in an audio and/or visual manner.

One of the refresher elements which can be accessed from the lookup table 58 is an interactive tutorial. This tutorial can take the form of a short graphic sequence with which a user must engage prior to continuing with the game. The tutorial will remind the user of the user of certain actuating elements of the controller and/or other issues concerning the game. The nature of the tutorial can vary depending on the length of absence of the user.

According to another aspect of the invention, an interactive tutorial can be provided to a user not only after a period of absence from a game, but also during play if it is determined that the user would benefit from such a tutorial.

Figure 10:
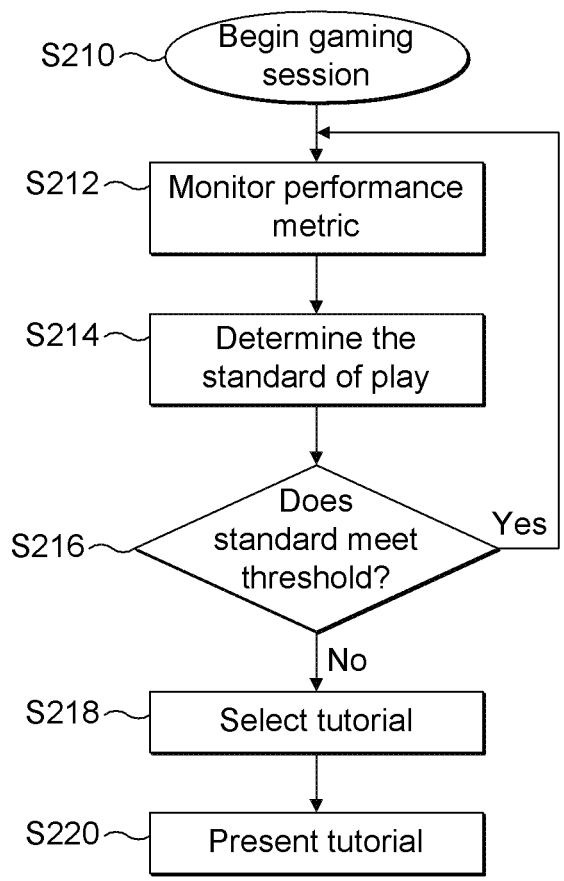
FIG. 10 is a schematic flow chart illustrating a method for presenting an interactive tutorial.

FIG. 10 is a schematic flowchart illustrating a method for presenting an interactive tutorial. After beginning a gaming session at step S210 the CPU 26 runs a watch function which monitors at least one performance metric (step S212) of a user during play. The standard of play of the user is determined at step S214 based on the monitored performance metric. The watch function decides at step S216 whether the standard of play meets a predetermined threshold. If the standard of play meets the threshold the watch function continues to monitor the performance metric at step S212; if it does not then an interactive tutorial is selected at step S218 and presented to the user at step S220.

In embodiments of the invention in which the tutorial is presented graphically, the graphics processor 24 displays the tutorial to the user via the display driver 22 and the display 20. In other embodiments the tutorial may be delivered via the audio output of the interactive computer game.

As an example, if a user repeatedly fails to conquer a particular challenge, an interactive tutorial will be presented to him indicating how to conquer the challenge and providing practice attempts in an interactive fashion. In another example, if the watch function identifies that a player is not performing tricks when jumping then it may initiate an interactive tutorial during gameplay disclosing the operation of the control interfaces required to perform a trick. This ensures that players are gaining the maximum benefit from the game features available. Additionally, the interactive tutorials are therefore targeted toward the players that need them.

Other features of the game and a player's performance may be utilized as performance metrics by the watching function. These include: the completion of game challenges; the use of hidden game areas; and the use of game short cuts. However, the invention is not limited to the performance metrics disclosed. The skilled worker would readily appreciate that almost any game feature could be utilized as a performance metric by the invention. If a user is not making the best use of any game feature this may be highlighted by the watching function and a tutorial delivered accordingly.

As used herein, the term "completion of game challenges" encompasses the completion by a user of the various stages of a game. For example, a game challenge may require that a user completes a certain race or stage of a race within a certain time. Progress beyond that race or stage may not be permitted without completion of the game challenge. The watch function may, when determining a user's standard of play, watch and record the attempts of the user to complete the game challenge and, if a user repeatedly fails to complete the game challenge, an appropriate tutorial may be delivered to the user to improve their performance.

As used herein the term "hidden game areas" encompasses game areas for which particular user actions are required before they are revealed. For example, a user may need to drive through a hedge or fence before an area of the game or track is revealed. The watch function may, when determining a user's standard of play, monitor and record the number of times that a user fails to activate hidden game areas. If a sufficient number of failures occur then an appropriate tutorial may be delivered. The skilled worker will appreciate that the same mechanism, mutatis mutandis, may be used to determine a user's standard of play based on the use of game short cuts as a performance metric.

The skilled worker will understand that similar mechanics for monitoring and recording performance metrics may be used for other features of the game. The watching function will monitor the metric and deliver the appropriate tutorial if performance does not meet a set threshold.

Figure 11:
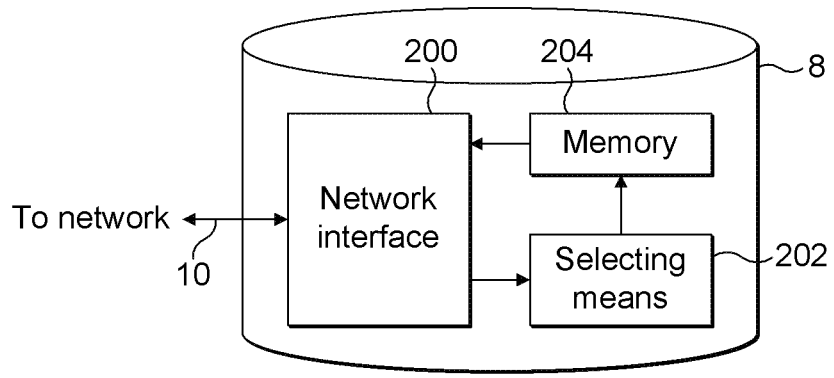
FIG. 11 is a schematic diagram of a suitable architecture.

In embodiments of the invention, the tutorial to be delivered may be selected from a set of tutorials held in memory. In embodiments in which the invention is implemented on a stand-alone computer games terminal 2a, 2b, 2c the tutorials are stored in memory 28, 30 of the computer games console 12. In embodiments in which the invention is implemented on a network the tutorials may be stored in memory within the game server 8. As shown in FIG. 11, the game server 8 comprises a network interface 200, which is adapted to receive from the computer games terminal 2a, 2b, 2c the determined standard of play of the user. The game server 8 further comprises a selecting means 202 configured to select an interactive tutorial from a set of predetermined interactive tutorials stored in memory 204. The selection of the interactive tutorial is made if the determined standard of play received from the computer games terminal 2a, 2b, 2c does not meet a predetermined threshold as set out above. The selected interactive tutorial is transmitted to the computer games terminal 2a, 2b, 2c via the network interface 202.

The standard of play of a user may be determined based on the user's position within the gameplay environment. Completion of past tasks required to progress through the game, as set out above, may indicate a level of user skill. For example, if a user is required in completing a past task to exhibit a particular standard of performance metric, say the performance of an advanced trick then this may be understood by the watching function as an indication that the user has the requisite knowledge to perform tricks. In future gaming sessions, if the same user does not perform tricks where necessary, the watching function may assume that this is intentional and, therefore, not deliver a tutorial on how to perform tricks. If the failure to perform tricks by the user continues for a prolonged period then the watching function may present a less intrusive form of tutorial; this may, for example, be a prompt asking the user if they require a refresher tutorial, or an indication on the screen that a refresher tutorial may be entered on actuation of a particular control surface.

The interactive tutorial can be provided as a graphics indication on the display, or in the form of an audio signal such as a voiceover which would give certain instructions to a user.

The nature of the interactive tutorial will vary depending on the point of the game that a user has reached and the performance metrics achieved by the user as determined by the watching process.

Figure 5:
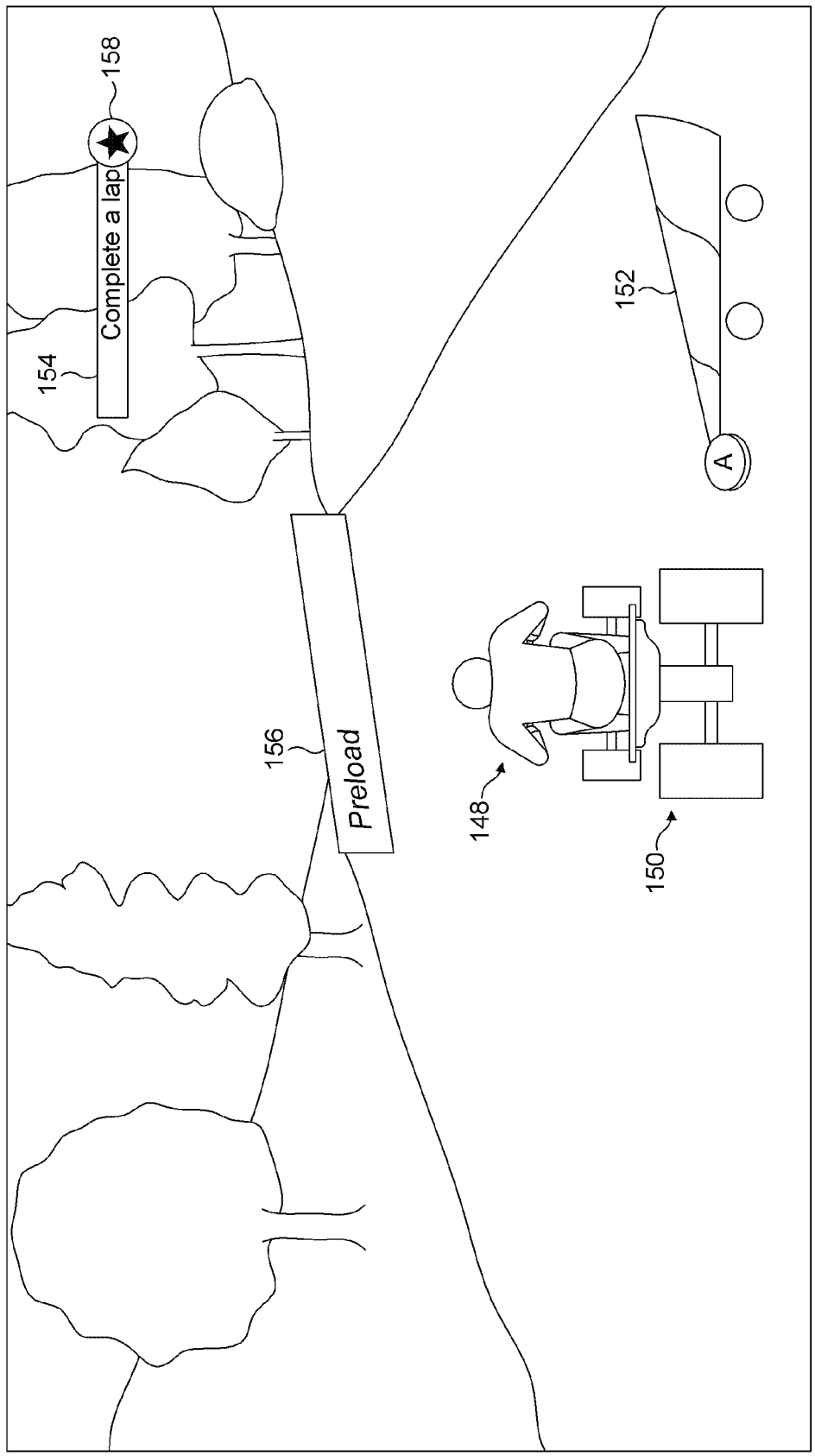
FIG. 5 illustrates a first screenshot of an interactive tutorial delivered outside of the gaming session.

Referring to FIG. 5, there is shown a screenshot from the game Pure. The screenshot shows a typical interactive tutorial. A game character 148 is shown riding a quad-bike 150 on a track. A thrill bar 152 displays a thrill level achieved by a player in the interactive tutorial. A tutorial objective 154 displays the objective that the player should achieve in order to complete the current section of the tutorial. A tutorial instruction 156 displays an action required to be performed by the player.

Once a tutorial objective 154 is complete a star 158 is highlighted to identify this to the player. In FIG. 2, the star 158 is highlighted identifying that the "complete a lap" tutorial objective 154 has been successfully completed.

The tutorial instruction 156 is displayed as a notification to the player that the next tutorial objective will be to complete a successful "preload" of the quad-bike 150. It will be appreciated that the tutorial instruction may also relate to any other game feature or action. The player is not yet required to complete the action of preloading but is forewarned that preload will be the next tutorial objective.

The tutorial instruction 156 may be accompanied by audio and/or visual instructions to inform the player how the action of preloading may be achieved. For example voice instructions may instruct the player on the operation of the control interfaces required in order to achieve preloading and/or a visual representation of controller 18 may be shown indicating the required operation of the control interfaces. These instructions may be displayed to the player before they are required to be acted upon. This allows the player to familiarise themselves with the required operations of the control interfaces before they are required to be performed.

Following notification to the player of the next tutorial objective, the new objective may be displayed to the player. The "preload" tutorial objective 160 can be seen displayed in FIG. 6.

The interactive tutorial may also provide instructions to the player at a time at which a particular action is required to be performed by the player.

Using the example of preloading, the player is required to pull back on the left thumbstick 128 when approaching a jump to preload the suspension of the quad-bike 150. At the top of the jump the player is required to push forward on the left thumbstick 128 to use the tension in the preloaded suspension to increase the height and length of the jump of quad-bike 150. The increased height, length and, consequently, time in the air affords the player more time in which to perform tricks.

The interactive tutorial may provide instructions at the times when the player is required to operate the control interfaces for preloading described above. The commands may be in the form of a tutorial instruction 156, an audio cue or a visual cue, e.g. a representation of a controller 18. The tutorial instruction 156 may be displayed when the player is required to preload the suspension of the quad-bike 150. An audio cue may be provided instructing the player to preload the suspension of the quad-bike. The audio cue may provide general commands such as "preload now" or may give more specific instructions such as "pull back on the left thumbstick now". A visual cue such as a representation of controller 18 may be provided that demonstrates visually to the player the operation of the control interfaces required at a particular time. This is described in more detail below with reference to FIG. 6.

Any combination of a tutorial instruction 156, an audio cue and/or a representation of a controller 18 may be used during the interactive tutorial to demonstrate the required operation of the control interfaces.

Figure 6:
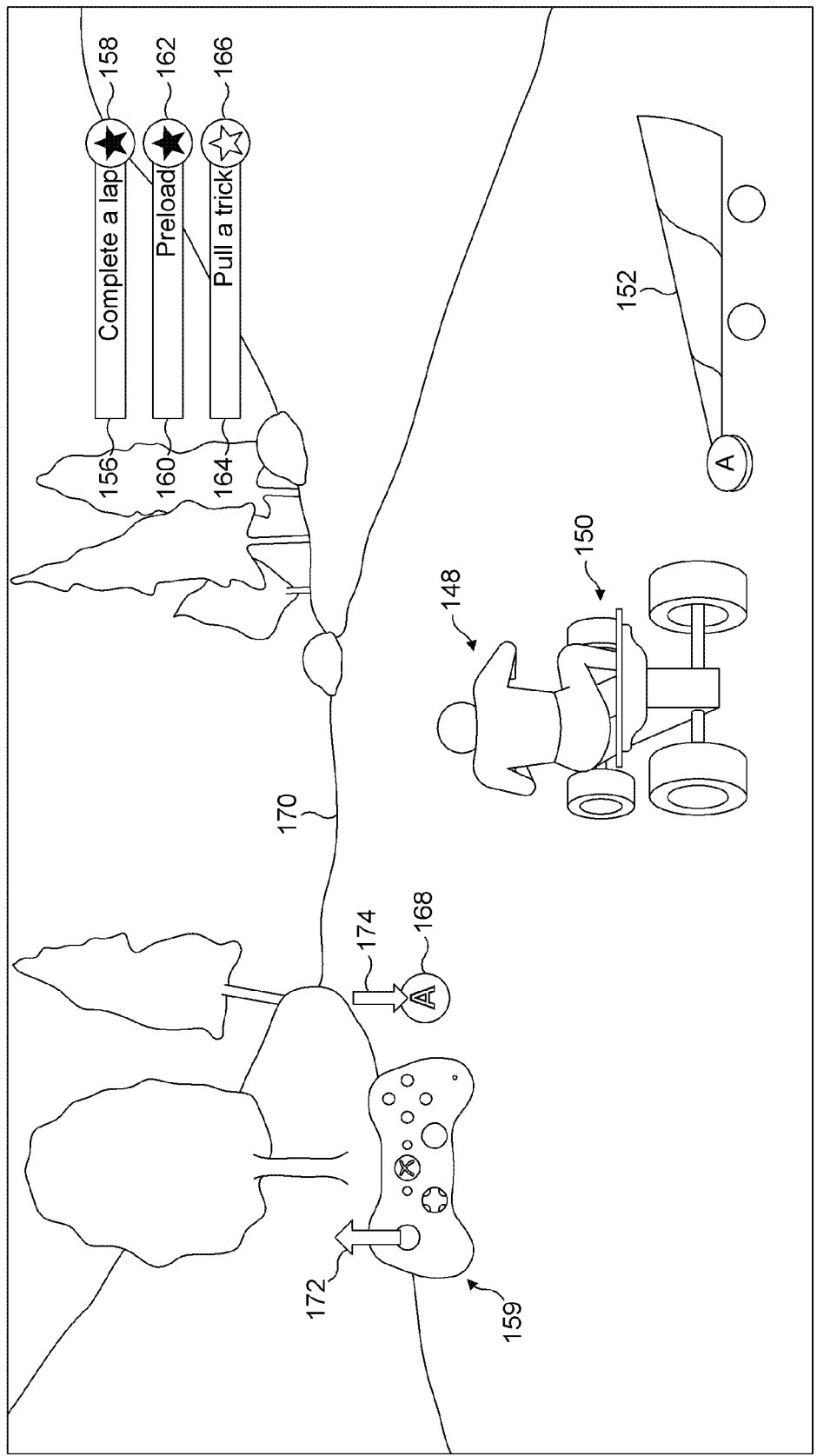
FIG. 6 illustrates a second screenshot of an interactive tutorial delivered outside of the gaming session.

Referring to FIG. 6 there is presented another screenshot of the game Pure. The screenshot shows an interactive tutorial and specifically shows the representation 159 of the controller. The screenshot shows the interactive tutorial providing tuition regarding the tutorial objective of "pulling a trick" 164. The tutorial objectives "complete a lap" 154 and "preload" 160 have already been completed as is demonstrated by the fact that the corresponding stars 158, 162 have been highlighted. The tutorial objective "pull a trick" 164 has not yet been completed and the corresponding star 166 is accordingly un-highlighted. Accompanying the representation 159 of the controller is a representation 168 of an A button.

FIG. 6 shows the game character 148 and the quad-bike 150 travelling uphill and approaching a jump. The top of the jump is seen as the horizon 170. The representation 159 of the controller and the representation 168 of the A button show the player the operation of these two control interfaces required in order to pull a trick and complete the tutorial objective 164. Arrow 172 shows the player that the left thumbstick 128 should be pushed forward and arrow 74 shows the player that the A button should be depressed. As shown in FIG. 6, these instructions may be provided to the player in advance or their required performance for familiarisation purposes as described above.

As shown by the highlighted star 162, the player has already learnt the preload feature and will therefore be able to increase the time spent in the air, allowing more time to pull a trick.

After leaving the top of the jump 170, the quad-bike 150 will be in the air and the trick should be performed. At this time the arrow 172 and the arrow 174 may be highlighted to indicate that the operation of the control interfaces should be performed. For example the arrows 172, 174 may be highlighted by flashing or by animation.

As mentioned above, the instructions delivered by the representation 159 of the controller and the A button 168 may be supplemented by audio cues and/or a tutorial instruction 156.

The interactive tutorial may be delivered on start-up of a game. It may be a requirement that all tasks within the tutorial environment are completed before a gaming session may be entered. In this way the tutorial may be used to assess player attributes and to ensure a minimum level of competency in particular areas of a game before beginning a gaming session.

The interactive tutorial may be adapted based on the time a player has spent away from the game and/or the progress of a player towards completion of the game. For example the number and type of tutorial objectives required for completion in the interactive tutorial may be varied. A player returning to a game from a long absence may require tuition on the basic features of the game, whereas a player who has been away from the game for a relatively short period of time may require tuition in the more advanced features. A player who is more advanced toward completion of the game can be credited with more knowledge of game features and may require tuition in advanced features, whereas a player who is less advanced through the game may require tuition on the basic features of the game.

In this way the interactive tutorial of the invention aids returning players in honing skills in relation to the various features of the game in a way that is tailored to a player's particular needs. The interactive tutorial does not force players to complete objectives which are not relevant to their ability or knowledge level. Therefore advanced players are not bored or patronised and less advanced players are provided with the tuition required for them to enjoy playing the game.

The interactive tutorial may also be delivered to the player during a gaming session within a game play environment. This may be in addition to or as an alternative to an interactive tutorial delivered to the player on start-up of the game.

The interactive tutorial delivered during the gaming session may disclose to the player new features of the game that are relevant to the particular stage of the game being played. Additionally new features of the game may be revealed or unlocked as rewards or achievements for the player completing certain stages of the game or passing certain landmarks; these may be disclosed to the player in an interactive tutorial.

Figure 7:
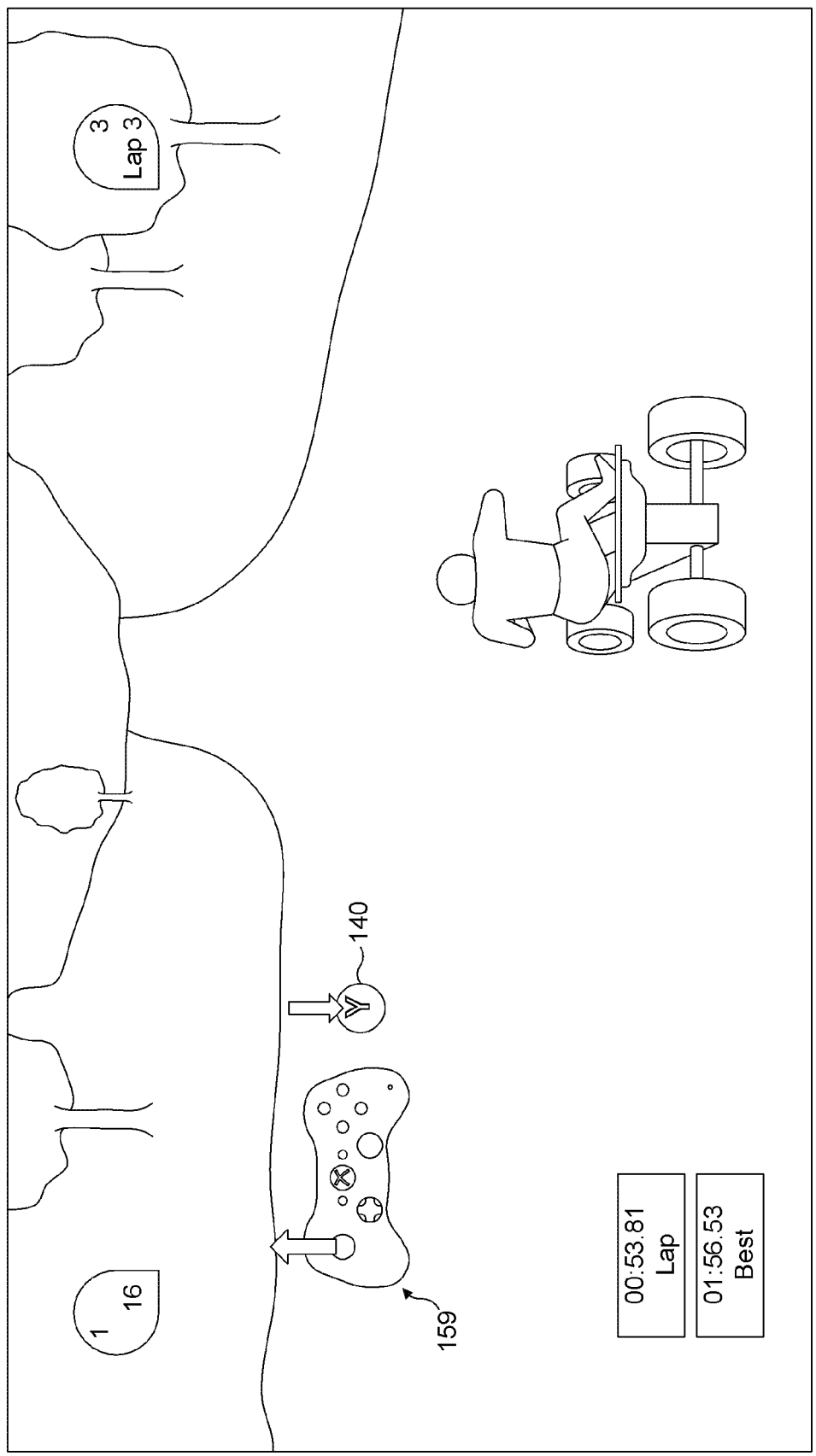
FIG. 7 illustrates a screenshot of an interactive tutorial delivered during a gaming session within the gameplay environment.

FIG. 7 shows a screenshot of an interactive tutorial delivered during a gaming session within the gameplay environment. The interactive tutorial displays a representation 159 of a controller and a representation 140 of a Y button. In FIG. 7, the interactive tutorial provides tuition on how to perform a trick. The operation of the interactive tutorial in this mode is as described earlier regarding the interactive tutorial delivered on start-up of a game.

In addition to the interactive tutorial delivered in the gameplay environment, the watch function may also initiate entry into an interactive tutorial outside the gameplay environment. After assessing the gameplay of the player the watch function may pause the gaming session and initiate an interactive tutorial similar to that delivered on start-up of a game and described above. The gaming session may be continued following successful completion of the interactive tutorial ensuring that the player has achieved a minimum standard of play.

Non-interactive tutorials may also be delivered to the player. These may be delivered at particular times, e.g. when loading sections of a game or following completion of a race or other section of a game. The times at which the non-interactive tutorials are delivered may be preset in order to disclose new or unlocked features of a game. Alternatively the non-interactive tutorials may be delivered based on the time the player has spent away from a game and/or the player's progress toward completion of the game. In this mode the non-interactive tutorial may be delivered on start-up of the game. The non-interactive tutorial may also be initiated by a watch function following an assessment of the player's gameplay during a gaming session.

Figure 8:
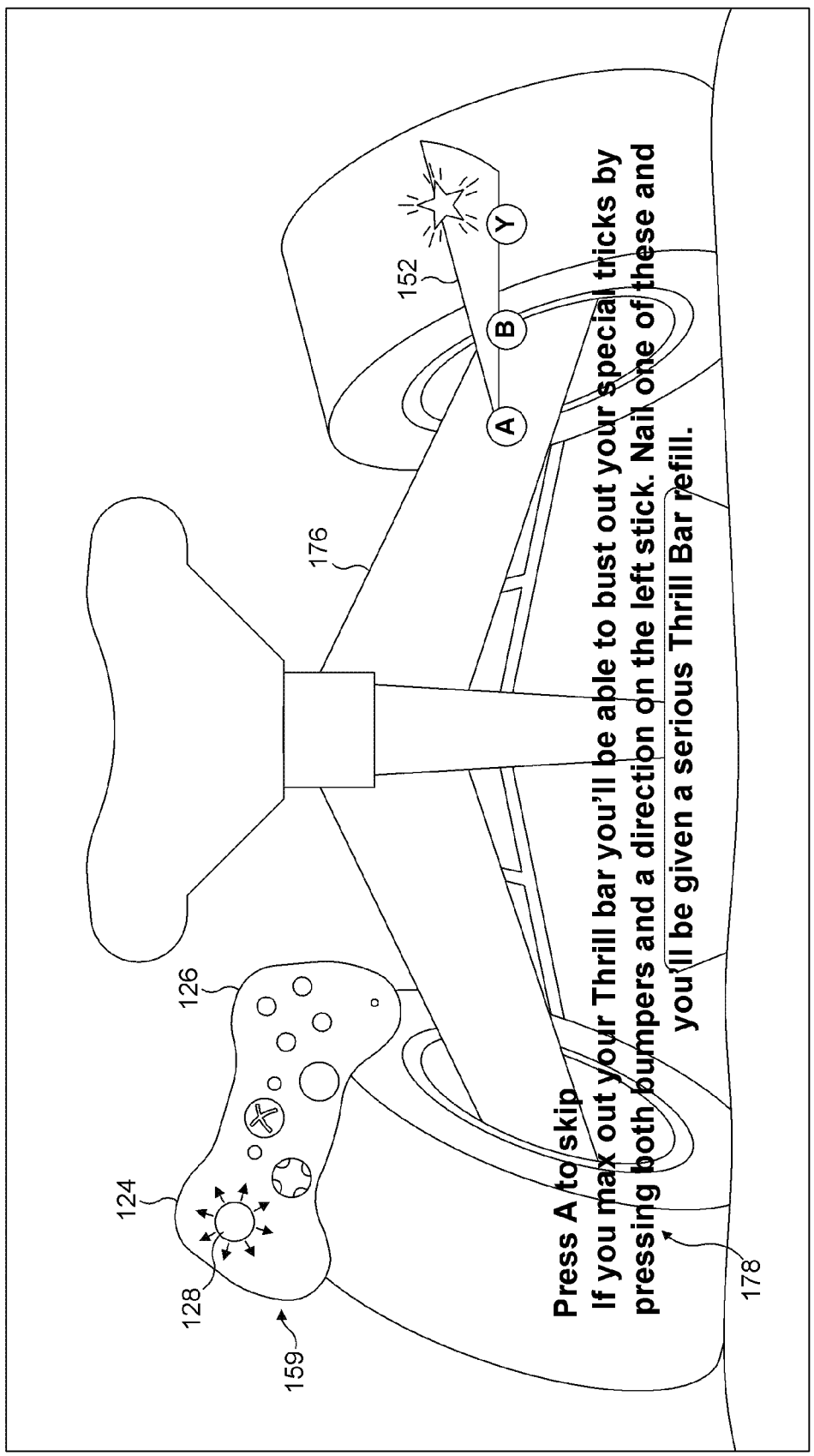
FIG. 8 illustrates a screenshot of a non-interactive tutorial.

FIG. 8 shows a screenshot from a non-interactive tutorial. The screenshot shows a thrill bar 152, a representation 159 of the controller, a quad-bike 176 and a text instruction 178. The non-interactive tutorial provides tuition and instruction to the player without the player being required to complete objectives.

FIG. 8 shows a still image of quad-bike 176. The non-interactive tutorial may provide a series of still images to demonstrate an action or feature of the game that the non-interactive tutorial is providing tuition on. The non-interactive tutorial may also provide an animation of a quad-bike or a game character. For example, if the non-interactive tutorial is providing tuition on preloading then a series of images or animation of the quad-bike 176 preloading the suspension when approaching a jump may be shown.

The non-interactive tutorial may also provide visual instruction to the player. The thrill bar 152, representation 159 of a controller and text instruction 178 of FIG. 5, combine to provide tuition to the player on how to perform special tricks. The text instruction 178 describes to the player how to perform the special trick using the left and right bumpers 124, 126 and the left thumbstick 128. The text instruction also notifies the player that the reward for performing such a special trick is to refill the thrill bar 152. The representation of a controller 159 also demonstrates to the player the operations of the control interfaces required to perform the trick. The arrows on the left thumbstick 128 show the directions in which it can be operated. Further the thrill bar 152 is shown completely full to demonstrate the reward achieved. Any combination of the thrill bar 152, representation of a controller 159 and/or text instruction 178 may be used to deliver visual instructions to the player.

Audio instructions may also be provided by the non-interactive tutorial. For example a voice over may read out the text instruction 178. In addition a voice over may, for example, be used to provide a commentary on the animation or images provided in the non-interactive tutorial, or to highlight certain features of a game to the player.

The images and animation, visual instructions and audio instructions may be synchronised to more effectively demonstrate to the player an action or feature of the game and/or the operations of the control interfaces required to perform it. For example the relevant operations of the control interfaces on the representation 159 of a controller may be highlighted at the moment that the series of images or animation demonstrate the feature or action to be performed. Similarly the thrill bar 152 may, in the example provided by FIG. 8, be refilled on completion of the special trick by the quad-bike 176 in the series of images or animation to demonstrate the reward gained following its performance. Audio instructions may also be provided in synchronisation with the series of images or animation.

Figure 9:
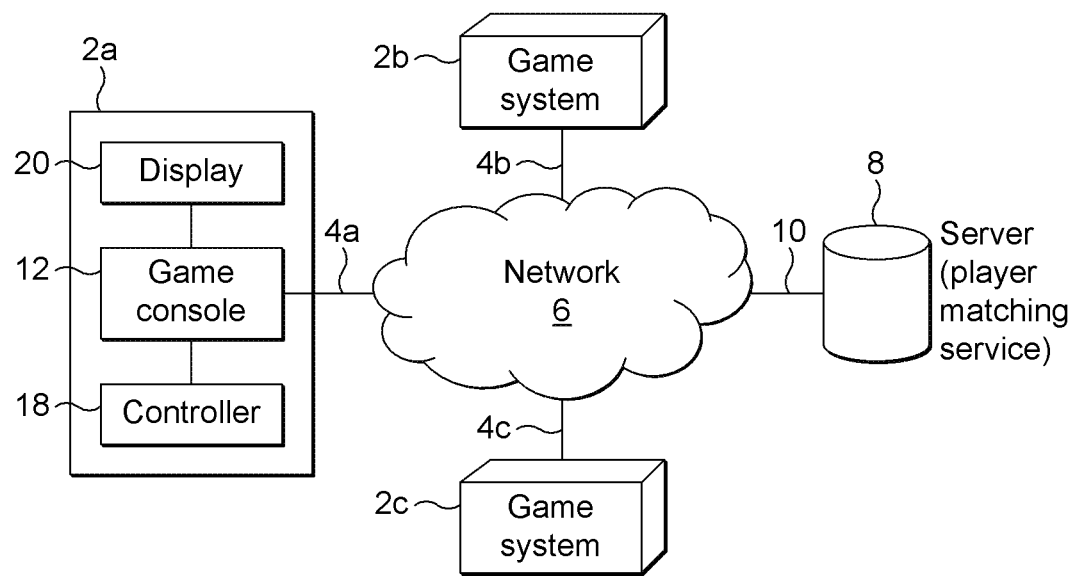
FIG. 9 is a schematic diagram of an online gaming environment.

In the above-described embodiment the game device is shown as a stand alone game device. Embodiments of the invention can also be applied in an interactive computer gaming system which has a plurality of games terminals connected by a network. FIG. 9 shows such a system.

FIG. 9 illustrates three computer game systems 2a, 2b, 2c. Each system is connected to a network 6 via a respective network connection 4a, 4b, 4c. The network 6 may be the Internet. A server 8 is also connected to the network 6 via a network connection 10. As illustrated with reference to computer game system 2a, each computer game system typically includes a computer game console 12 or hardware device, a player/user input device or controller 18 connected to the computer game hardware device 12, and a display 20 connected to the computer game hardware device. The computer game console 12 is adapted for connection to the network connection 4a. Although in the example shown the controller 18 and display 20 are shown as distinct from the console 12, the computer game system may be implemented in a variety of ways, for example with the controller, display and console forming a single integrated device.

Various aspects of the various described arrangements may be combined, no described arrangement being limited to a stand-alone arrangement. In a preferred implementation, all described arrangements are implemented together.

Various additional modifications and variations to the invention and its described embodiments will be apparent to one skilled in the art. All deviations from the specific teachings of this specification that rely upon the principles and their equivalents through which the art has been advanced are within the scope of the invention as described and claimed.

For example, the above description comments on the usefulness of the described techniques in providing enhanced operations in the case of an interactive game involving multiple interactive networked players, and particularly for an interactive racing game. The techniques are readily applicable to many other interactive game settings in which a player moves a user-controlled character (avatar) through a virtual game world, interacts with game (or other user) controlled characters (avatars) or objects, including responding to the interaction by selecting particular behaviors or actions for their user-controlled characters, and views the actions of the game controlled characters as they respond to these behaviors or actions.

As will be clear to those skilled in the arts, numerous embodiments of interactive game apparatus and interactive game controllers may be used to practice the present invention, e.g., to run the methods described herein as part of an interactive video game program stored on storage medium such as memory card, game cartridge, or the like, and the above description of an interactive game device is not intended to limit the breadth of coverage. For example, the interactive game program may be stored on a disk (e.g., a CD or other data storage media) and downloaded into a computer's memory to be run or run from disk. Alternatively, the game program and its animations may be accessed by using an electronic device to access a Web site or to access (in a wired or wireless manner) memory over a digital communications network such as the Internet and the interactive game may be run remotely or after storage on local memory.

While LCDs are one preferred embodiment, the monitor or display device may be of any other suitable type, e.g. an EL (Electro Luminescence) display device. Moreover, the resolution of the monitor or display device is not limited to the particular resolution used herein.

The invention claimed is:

1. A computer-implemented method of automatically generating user-specific tutorials for an interactive game on a games terminal, the method comprising:

monitoring, using a processor, a performance metric of a user in a gaming session, the performance metric comprising at least one of: (i) use of a hidden game area in a gameplay environment of the interactive game, and (ii) use of a game shortcut in the gameplay environment;

generating a tutorial for the user based on the performance metrics, wherein the tutorial is generated based on: (i) a time difference between a first play session and a second play session of the user, and (ii) a skill level of the user falling below a predefined skill threshold, wherein the skill level of the user is determined based on a progress of the user towards completing the predefined gameplay objective of the at least one performance metric; and outputting the tutorial to the user, without receiving, from the user, any request for the tutorial.

2. A computer-implemented method of automatically generating user-specific tutorials for an interactive game on a games terminal and based on idle time, lack of progress, and skill falloff, the method comprising:

determining an idle time of the user, comprising the difference between: (i) a first time retrieved from a user profile of the user and denoting an end of a previous play session of the user in the interactive game and (ii) a second time denoting commencement of a current play session of the user in the interactive game;

determining a lack of progress of the user, comprising a measure of progress of the user towards completing a predefined gameplay objective in the interactive game and the measure of progress of the user falling below a predefined progress threshold;

determining a skill falloff of the user, comprising a skill level of the user falling below a predefined skill threshold, wherein the skill level of the user is determined based on each of: (i) the progress of the user towards completing the predefined gameplay objective, and (ii) a performance metric, the performance metric comprising at least one of: (i) use of a hidden game area in a gameplay environment of the interactive game, and (ii) use of a game shortcut in the gameplay environment;

generating, for the user and by operation of one or more computer processors, a first tutorial that includes a plurality of refresher elements pertaining to the interactive game and programmatically selected based on the idle time of the user, the skill falloff of the user, and the lack of progress of the user; and outputting the first tutorial to the user in order to assist the user in overcoming the idle time, the skill falloff, and the lack of progress when playing the interactive game, and without receiving, from the user, any request for the first tutorial.

3. A method according to claim 2, wherein the first time and second time are determined from a real time clock on the computer games terminal, wherein the user profile comprises: (i) the skill level, and (ii) the first time, wherein a lookup table is configured to store the plurality of refresher elements, the method further comprising:

providing a lookup table configured to store the plurality of refresher elements, wherein the lookup table is configured to store at least one of the plurality of refresher elements in a group of refresher elements, wherein the group of refresher elements is associated with a respective group time difference.

4. A method according to claim 3, wherein the outputting of the first tutorial comprises displaying the plurality of refresher elements on a display of the games terminal.

5. A method according to claim 4, comprising providing the plurality of refresher elements to the user using audio signals, wherein the first tutorial does not include refresher elements for gameplay objectives that are not relevant to the skill level and the measure of progress of the user, wherein the performance metric further comprises at least two of: (i) completion of a game challenge, (ii) use of the hidden game area, and (iii) use of the game shortcut.

6. A method according to claim 5, comprising storing in the user profile a level of the game attained by the user at the first time and providing the plurality of refresher elements based on the attained level of play.

7. A method according to claim 6, wherein the plurality of refresher elements are selected from the group comprising:

primary objectives of the game;
secondary objectives of the game;
short term goals;
character information;
a next objective of the game subsequent to the user completing a previous objective of the game;
medium term goals; and
plot related elements.

8. A method according to claim 7, wherein the plurality of refresher elements include a reminder concerning use of actuators on a control device for playing the game, wherein the reminder comprises: (i) a basic reminder representing operation of the control device at a basic level of the interactive game, and (ii) a complex reminder representing operation of the control device at a more complex level of the interactive game.

9. A method according to claim 8, wherein the refresher elements include an indication of a story underlying the game, wherein the first tutorial does not include instructions to perform a first trick in the game upon determining that the user is intentionally not performing the first trick, wherein the performance metric further comprises each of: (i) completion of the game challenge, (ii) use of the hidden game area, and (iii) use of the game shortcut.

10. A method according to claim 9, comprising arranging each of the plurality of refresher elements in groups, each group being provided to the user depending on the respective group time difference, wherein a first group of refresher elements is provided at a first group time difference, and the first and a second group of refresher elements are provided at a second group time difference, longer than the first group time difference.

11. A method according to claim 10, wherein the plurality of refresher elements include an interactive tutorial.

12. The computer-implemented method of claim 2, wherein the first tutorial is generated based on the difference between the first time and the second time, the skill level of the user, and the progress of the user towards completing the predefined gameplay objective, wherein the tutorial does not include refresher elements for objectives that are not relevant to the skill level and the measure of progress of the user, wherein the tutorial does not include instructions to perform a first trick in the game upon determining that the user is intentionally not performing the first trick, wherein the performance metric further comprises at least two of: (i) completion of a game challenge, (ii) use of the hidden game area, and (iii) use of the game shortcut.

13. The computer-implemented method of claim 2, wherein the plurality of refresher elements does not include a refresher element conveying to the user how to perform a predefined action that the user previously performed, further comprising:

subsequent to outputting the first tutorial to the user, determining that the user has not performed the predefined action for a predefined amount of time; and generating a second tutorial that includes the refresher element;

wherein a different idle time, a different lack of progress, or a different skill falloff of a second user causes a tutorial having a different plurality of refresher elements to be generated.

14. A computer, comprising:

a memory containing a program;

a computer processor which when executing the program contained in the memory, performs an operation to automatically generate user-specific tutorials for an interactive game on a games terminal and based on idle time, lack of progress, and skill falloff, the operation comprising:

determining an idle time of the user, comprising the difference between: (i) a first time retrieved from a user profile of the user and denoting an end of a previous play session of the user in the interactive game and (ii) a second time denoting commencement of a current play session of the user in the interactive game;

determining a lack of progress of the user, comprising a measure of progress of the user towards completing a predefined gameplay objective in the interactive game and the measure of progress of the user falling below a predefined progress threshold;

determining a skill falloff of the user, comprising a skill level of the user falling below a predefined skill threshold, wherein the skill level of the user is determined based on each of: (i) the progress of the user towards completing the predefined gameplay objective, and (ii) a performance metric, the performance metric comprising at least one of: (i) use of a hidden game area in a gameplay environment of the interactive game, and (ii) use of a game shortcut in the gameplay environment;

generating, for the user and by operation of one or more computer processors, a first tutorial that includes a plurality of refresher elements pertaining to the interactive game and programmatically selected based on the idle time of the user, the skill falloff of the user, and the lack of progress of the user; and outputting the first tutorial to the user in order to assist the user in overcoming the idle time, the skill falloff, and the lack of progress when playing the interactive game, and without receiving, from the user, any request for the first tutorial.

15. A computer according to claim 14, comprising a clock for providing the first time and the second time.

16. A computer according to claim 15, wherein the user profile comprises: (i) the skill level, and (ii) the first time, the computer further comprising:

a display for displaying the plurality of refresher elements; and a lookup table residing in the memory configured to store the plurality of refresher elements, wherein the lookup table is configured to store at least one of the plurality of refresher elements in a group of refresher elements, wherein the group of refresher elements is associated with a respective group time difference.

17. A computer according to claim 16, the operation further comprising providing the plurality of refresher elements in the form of an audio signal, wherein the first tutorial does not include refresher elements for objectives that are not relevant to the skill level and the measure of progress of the user, wherein the first tutorial does not include instructions to perform a first trick in the game upon determining that the user is intentionally not performing the first trick, wherein the performance metric further comprises at least two of: (i) completion of a game challenge, (ii) use of the hidden game area, and (iii) use of the game shortcut.

18. A computer according to claim 17, wherein the user profile holds data pertaining to a level of play achieved by the user in the previous play session, the plurality of refresher elements being selected based on the level of play.

19. A computer according to claim 18, comprising a storage device adapted to store the plurality of refresher elements in groups, wherein the groups of refresher elements are provided to the user based on first and second differences.

20. A computer according to claim 19, embodied in a games terminal.

21. A computer according to claim 14, wherein the interactive application is a computer game.

22. A non-transitory computer readable storage medium containing a program which, when executed by one or more processors, performs an operation to automatically generate user-specific tutorials for an interactive game on a games terminal and based on idle time, lack of progress, and skill falloff, the operation comprising:

determining an idle time of the user, comprising the difference between: (i) a first time retrieved from a user profile of the user and denoting an end of a previous play session of the user in the interactive game and (ii) a second time denoting commencement of a current play session of the user in the interactive game;

determining a lack of progress of the user, comprising a measure of progress of the user towards completing a predefined gameplay objective in the interactive game and the measure of progress of the user falling below a predefined progress threshold;

determining a skill falloff of the user, comprising a skill level of the user falling below a predefined skill threshold, wherein the skill level of the user is determined based on each of: (i) the progress of the user towards completing the predefined gameplay objective, and (ii) a performance metric, the performance metric comprising at least one of: (i) use of a hidden game area in a gameplay environment of the interactive game, and (ii) use of a game shortcut in the gameplay environment;

generating, for the user and by operation of one or more computer processors, a first tutorial that includes a plurality of refresher elements pertaining to the interactive game and programmatically selected based on the idle time of the user, the skill falloff of the user, and the lack of progress of the user; and outputting the first tutorial to the user in order to assist the user in overcoming the idle time, the skill falloff, and the lack of progress when playing the interactive game, and without receiving, from the user, any request for the first tutorial.

23. A computer readable storage medium according to claim 22, wherein outputting the first tutorial comprises displaying the plurality of refresher elements on a display, wherein the user profile comprises: (i) the skill level, and (ii) the first time, the computer-readable storage medium further comprising:

providing a lookup table configured to store the plurality of refresher elements, wherein the lookup table is configured to store at least one of the plurality of refresher elements in a group of refresher elements, wherein the group of refresher elements is associated with a respective group time difference.

24. A computer readable storage medium according to claim 22, comprising providing the plurality of refresher elements to the user using audio signals, wherein the tutorial does not include refresher elements for objectives that are not relevant to the skill level and the measure of progress of the user, wherein the tutorial does not include instructions to perform a first trick in the game upon determining that the user is intentionally not performing the first trick, wherein the performance metric further comprises at least two of: (i) completion of a game challenge, (ii) use of the hidden game area, and (iii) use of the game shortcut.

25. A computer readable storage medium according to claim 22, comprising storing in the user profile a level of the game attained by a user at the stop time and providing the plurality of refresher elements based on the attained level of play.

26. A computer readable storage medium according to claim 22, wherein the plurality of refresher elements are selected from the group comprising primary objectives of the game, secondary objectives of the game, short term goals, medium term goals, and other plot related elements.

27. A computer readable storage medium according to claim 22, comprising arranging each of the plurality of refresher elements in groups, each group being provided to the user depending on the respective group time difference, wherein a first group of refresher elements is provided at a first group time difference, and the first and a second group of refresher elements are provided at a second group time difference, longer than the first group time difference, wherein the performance metric further comprises each of: (i) completion of a game challenge, (ii) use of the hidden game area, and (iii) use of the game shortcut.

28. A computer-implemented method of automatically generating user-specific tutorials for an interactive game on a games terminal and based on idle time, lack of progress, and skill falloff, the method comprising:
retrieving from a user profile stored in a memory of the games terminal:
a first time for a user, the first time denoting an end of a play session in a game;
user data pertaining to a progress towards completing a predefined gameplay objective in the interactive computer game;
determining a second time for the user, the second time denoting commencement of a new play session in the game; and
determining an idle time of the user, comprising the difference between the first time and the second time;
determining a lack of progress of the user, comprising a measure of progress of the user towards completing a predefined gameplay objective in the interactive computer game and the measure of progress of the user falling below a predefined progress threshold;
determining a skill falloff of the user, comprising a skill level of the user falling below a predefined skill threshold, wherein the skill level of the user based on each of: (i) the progress of the user towards completing the predefined gameplay objective, and (ii) a performance metric, the performance metric comprising at least one of: (i) use of a hidden game area in a gameplay environment of the interactive game, and (ii) use of a game shortcut in the gameplay environment;
generating, for the user and by operation of one or more computer processors, a tutorial that includes a plurality of refresher elements pertaining to the interactive game and programmatically selected based on the idle time of the user, the skill falloff of the user, and the lack of progress of the user; and
outputting the first tutorial to the user in order to assist the user in overcoming the idle time, the skill falloff, and the lack of progress when playing the interactive game, and without receiving, from the user, any request for the first tutorial.

29. A computer-implemented method according to claim 28, wherein the user data comprises: (i) the skill level, and (ii) the first time, the method further comprising:
presenting the tutorial to the user based on the level of play of the user; and
providing a lookup table configured to store the plurality of refresher elements, wherein the lookup table is configured to store at least one of the plurality of refresher elements in a group of refresher elements, wherein the group of refresher elements is associated with a respective group time difference.

* * * * *